Patented July 31, 1945

UNITED STATES PATENT OFFICE 2,380,731

RESTORATION OF CATALYSTS

Leonard C. Drake, Wenonah, and John Herman and Eugene T. Scafe, Woodbury, N. J., assignors to Socony-Vacuum Oil Company, Incorporated, New York, N. Y., a corporation of New York No Drawing. Application December 9, 1941, Serial No. 422,230

5 Claims. (Cl. 252—239)

This invention relates to a process for restoring the properties of catalysts and is particularly concerned with such treatment of clay-type or synthetic catalysts used in the conversion of high boiling hydrocarbons to hydrocarbons boiling within the gasoline range.

In the catalytic cracking of high boiling hydrocarbons to produce gasoline hydrocarbons, the charge stock is contacted with a catalyst composed predominantly of argillaceous material, or a synthetic catalyst of which several are known to the art, usually disposed as a bed of granules within a conversion chamber. During the conversion operation a carbonaceous material, commonly refered to as "coke" is deposited on the surface of the contact mass, thereby impairing the catalytic efficiency of the granular catalyst. It is usual practice to discontinue contact of charge stock with the catalyst when a substantial impairment of the catalytic efficiency has taken place and regenerate the catalyst by passing an oxidizing gas through the mass at elevated temperature to burn off the carbonaceous contaminant, whereupon, the catalyst is returned to the conversion part of the cycle. This alternate conversion and regeneration are well known to the art, being disclosed in patents to Eugene J. Houdry and associates.

The term "catalytic efficiency" as used in this art denotes conversion to gasoline hydrocarbons, i. e. percentage yield of hydrocarbons boiling within the gasoline range from higher boiling hydrocarbons such as gas oil. It will be immediately apparent that this term is not identical with total cracking effect of the catalyst since conversion to products lighter than gasoline (more intense cracking) decreases the yield of gasoline. The best cracking catalyst for the present purpose is obviously one which is relatively moderate in effect. It may even be said that excellent cracking catalysts, when considered on the basis of total cracking effect, are not suitable for production of gasoline. Bearing in mind that "catalytic efficiency" as applied to this invention and the related art has reference to the power to promote conversion of heavy hydrocarbons to gasoline, the nature and advantages of the invention will appear from the detailed discussion below.

As cracking catalysts are carried through a series of cycles of alternate conversion and regeneration, the catalytic efficiency slowly but steadily decreases until the yield of gasoline becomes so low that the catalyst is no longer commercially practical for further use. The catalyst must then be removed from the conversion chamber and discarded. This constitutes an economic waste of substantial proportions since the catalyst must be prepared in a careful manner from carefully selected raw clays or other raw materials. This invention contemplates a treatment of the catalyst at the time when its catalytic efficiency may be referred to as "spent" as contrasted with the term "contaminated" applied to the catalyst mass at the conclusion of a conversion run when it is so coated with coke as to require regeneration by burning. The present process may be distinguished from the conventional oxidation regeneration by terming it "restoration." The various terminology defined above shall be regarded as having the meanings given when employed in this specification and the claims annexed hereto.

We have found that the decline in catalytic efficiency of the contact mass is apparently associated with variations in the iron content of the mass. It is believed that the increase in iron content noted by us during service arises from action of the gases within the chamber on the ferrous metal walls defining the reaction zone. During different parts of the cycle, the metal of the chamber walls, heat exchange elements, etc., is subjected to alternate reducing and oxidizing atmospheres created by the presence of hydrocarbon gases, hydrogen, carbon, oxides of carbon, oxygen and water vapor. These several gases in cumulative effect tend to produce on the metal surfaces a finely divided, active iron oxide or oxides which may be transferred to the surfaces of the granular contact material.

The finely divided mixture of iron and its oxides has a strong catalytic action on hydrocarbons at the operating temperatures, inducing excessive decomposition of a portion of the charge stock, thereby seriously decreasing the yield of gasoline hydrocarbons and producing a carbonaceous deposit in excess of that normally obtained by the action on such charge stock of fresh contact material. Insofar as can be determined from study of data obtained, the theory outlined above accurately corresponds with the factual information available. That theory will, therefore, be used herein in describing the process, it being understood that the theory is not to be regarded as limiting the invention.

According to the invention the catalyst is treated to remove therefrom those materials which tend to impair its catalytic efficiency for the purpose intended. This result is advantageously accomplished by leaching with an aqueous solution which dissolves out the iron, such as solutions of organic acids and dilute solutions of mineral acids. These acid solutions may be classified as weak acids. Concentrated solutions of mineral acids are to be avoided because of their detrimental effect on the catalst. Dilute mineral acid, for example, a 1% to 10% aqueous solution of hydrochloric acid, will produce satisfactory results; although we prefer to use aqueous solutions of organic acids such as oxalic, acetic and lactic. It is contemplated that solutions of acid salts and other acid materials are included within the term "weak acid solution." In general, alkali metal acid salts are to be avoided as resulting in adsorption of metals on the catalyst which must then be leached out. Ammonium acid sulphate is suggested as suitable, but solutions of acids are much preferred. The acid must, of course, be such that water soluble iron salts are formed and must not be strong enough to dissolve excessive amounts of aluminum oxide from the catalyst.

The leaching or other process for removal of iron and the like from the catalyst need not be carried to completion since it is found that any material reduction in these materials is accompanied by a substantial increase in catalytic efficiency as evidenced by high yields of gasoline and substantially decreased carbon deposition. It is also found that the present process results in removal of definite proportions of other metallic elements which may have in their free or oxidized state appreciable effect on the catalytic efficiency due to induction of excessive cracking. Among such metals may be mentioned magnesium, chromium, copper, vanadium, strontium, lithium, sodium and lead.

Although, as noted above, weak acid solutions in general are suited to the purposes of the invention, we prefer to use aqueous solutions of oxalic acid because of the increased effect due to formation of complex iron-oxalate anions.

For example, a sample of alumino-silicate catalyst, removed from a commercial cracking case after a period of service, was found to be contaminated with a considerable amount of finely divided iron oxides. This catalyst was washed 12 times with fresh portions of 10% solution of oxalic acid at 160° F. to 200° F. Each acid wash was followed by a water wash.

The removal of iron and other metals is aided by preliminary reduction of the spent catalyst in a stream of hydrogen at elevated temperatures.

The washed catalyst was then dried at 250° F. to 260° F., heat treated at 1000° F., and tested by comparison with a sample of the same catalyst from which iron was not removed. In runs made under identical conditions, employing Oklahoma City gas oil charge stock, the following results were obtained:

*Comparison of catalysts with Oklahoma City gas oil charge*

| | Catalyst as removed from commercial case | Catalyst treated with oxalic acid |
|---|---|---|
| Yield liquid product, percent wt. charge | 95.0 | 95.9 |
| Yield 410° F. E. P. gasoline, percent vol. charge | 20.0 | 28.7 |
| Coke formed, percent wt. charge | 2.3 | 1.5 |

These results show that the restored catalyst caused formation of slightly less than two-thirds the amount of coke deposited on the unrestored catalyst and, although the increase in total liquid recovery was only slightly higher, the gasoline yield was increased by 43.5% through restoration operations.

Similar results were obtained with n-heptane which is representative of pure organic compounds which may be cracked catalytically.

*Comparison of catalysts with N-heptane charge*

| | Catalyst as removed from commercial case | Catalyst treated with oxalic acid |
|---|---|---|
| Yield liquid product, percent wt. charge | 92.6 | 95.5 |
| Coke formed, percent wt. charge | 3.3 | 1.7 |

Spectroscopic analysis of the catalyst samples show iron contents of 1.3% and 0.6% before and after treating, respectively. As already pointed out, complete removal of the iron is not necessary.

We claim:

1. A process for restoring a clay-type alumina-containing catalyst which has become spent in a series of cycles of alternate conversion of hydrocarbons and regenerations and which has acquired an appreciable increase in iron content during service which comprises leaching said catalyst with an aqueous solution of an organic acid selected from the group consisting of oxalic acid, acetic acid and lactic acid, thereby removing substantially all of the iron content and thereafter removing substantially all of the leaching solution.

2. A process for restoring a clay-type alumina-containing catalyst which has become spent in a series of cycles of alternate conversion of hydrocarbons and regenerations and which has acquired an appreciable increase in iron content during service which comprises leaching said catalyst with an aqueous solution of oxalic acid, thereby removing substantially all of the iron content and thereafter removing substantially all of the leaching solution.

3. A process for restoring a clay-type alumina-containing catalyst which has become spent in a series of cycles of alternate conversion of hydrocarbons and regenerations and which has acquired an appreciable increase in iron content during service which comprises leaching said catalyst with an aqueous solution of acetic acid, thereby removing substantially all of the iron content and thereafter removing substantially all of the leaching solution.

4. A process for restoring a clay-type alumina-containing catalyst which has become spent in a series of cycles of alternate conversion of hydrocarbons and regenerations and which has acquired an appreciable increase in iron content during service which comprises leaching said catalyst with an aqueous solution of lactic acid, thereby removing substantially all of the iron content and thereafter removing substantially all of the leaching solution.

5. A process for restoring a clay-type alumina-containing catalyst which has become spent in a series of cycles of alternate conversion of hydrocarbons and regenerations and which has acquired an appreciable increase in iron content during service which comprises leaching said catalyst with an aqueous solution of oxalic acid, having a concentration of about 10% and at a temperature between 160° F. and 200° F., thereby removing substantially all of the iron content and thereafter removing substantially all of the leaching solution.

LEONARD C. DRAKE.
JOHN HERMAN.
EUGENE T. SCAFE.